US011658329B2

(12) United States Patent
Li et al.

(10) Patent No.: US 11,658,329 B2
(45) Date of Patent: *May 23, 2023

(54) SECONDARY BATTERY AND ELECTRODE PLATE THEREOF

(71) Applicant: CONTEMPORARY AMPEREX TECHNOLOGY CO., LIMITED, Ningde (CN)

(72) Inventors: Wei Li, Ningde (CN); Zige Zhang, Ningde (CN); Chengdu Liang, Ningde (CN); Qingrui Xue, Ningde (CN); Jing Li, Ningde (CN); Pengxiang Wang, Ningde (CN)

(73) Assignee: CONTEMPORARY AMPEREX TECHNOLOGY CO., LIMITED, Fujian (CN)

(*) Notice: Subject to any disclaimer, the term of this patent is extended or adjusted under 35 U.S.C. 154(b) by 188 days.

This patent is subject to a terminal disclaimer.

(21) Appl. No.: 17/233,337

(22) Filed: Apr. 16, 2021

(65) Prior Publication Data

US 2021/0234188 A1    Jul. 29, 2021

Related U.S. Application Data

(63) Continuation of application No. 16/267,042, filed on Feb. 4, 2019, now Pat. No. 11,024,870.

(30) Foreign Application Priority Data

Oct. 11, 2018   (CN) .......................... 201821651128.4

(51) Int. Cl.
*H01M 10/04* (2006.01)
*H01M 4/02* (2006.01)
(Continued)

(52) U.S. Cl.
CPC ......... *H01M 10/0436* (2013.01); *H01M 4/02* (2013.01); *H01M 50/534* (2021.01);
(Continued)

(58) Field of Classification Search
CPC .. H01M 10/0436; H01M 4/02; H01M 50/534; H01M 50/536; H01M 50/538;
(Continued)

(56) References Cited

U.S. PATENT DOCUMENTS 8,734,986 B2     5/2014  Yamamura et al.
11,024,870 B2 *  6/2021  Li ..................... H01M 10/0436
(Continued)

FOREIGN PATENT DOCUMENTS

CN    106981665 A     7/2017
CN    207542313 U     6/2018
(Continued)

OTHER PUBLICATIONS

Contemporary Amperex Technology Co., Limited, Extended European Search Report, EP19153877.6, dated May 31, 2019, 8 pgs.
(Continued)

*Primary Examiner* — Stewart A Fraser
(74) *Attorney, Agent, or Firm* — Morgan, Lewis & Bockius LLP

(57) ABSTRACT

The present disclosure provides a secondary battery and an electrode plate thereof. The electrode plate comprises a current collector, an active material layer and a second conducting layer. The current collector comprises an insulating layer and a first conducting layer disposed on at least one surface of the insulating layer; and the active material layer is disposed on a main portion of the first conducting layer. The first conducting layer further includes a protruding portion not coated with the active material layer. The second conducting layer comprises a first portion disposed (Continued)

on a surface of the protruding portion of the first conducting layer opposite to the insulating layer. The secondary battery comprises an electrode assembly, the electrode assembly comprises the electrode plate.

14 Claims, 6 Drawing Sheets

(51) Int. Cl.
*H01M 50/538* (2021.01)
*H01M 50/536* (2021.01)
*H01M 50/534* (2021.01)

(52) U.S. Cl.
CPC ........ *H01M 50/536* (2021.01); *H01M 50/538* (2021.01); *H01M 2004/021* (2013.01)

(58) Field of Classification Search
CPC ......... H01M 2004/021; H01M 10/052; H01M 4/667
See application file for complete search history.

(56) References Cited

U.S. PATENT DOCUMENTS

| | | |
|---|---|---|
| 2012/0196172 A1 | 8/2012 | Maeda et al. |
| 2012/0244423 A1 | 9/2012 | Kusukawa et al. |
| 2013/0177787 A1 | 7/2013 | Arima et al. |
| 2013/0177788 A1* | 7/2013 | Hasegawa ............. H01M 50/54 429/62 |

FOREIGN PATENT DOCUMENTS

| | | |
|---|---|---|
| CN | 108598491 A | 9/2018 |
| CN | 208507818 U | 2/2019 |
| EP | 2482368 A1 | 8/2012 |

OTHER PUBLICATIONS

Contemporary Amperex Technology Co., Limited, First Office Action, CN201821651128.4, dated Apr. 19, 2019, 2 pgs.
Li, Office Action, U.S. Appl. No. 16/267,042, dated Nov. 9, 2020, 8 pgs.
Li, Notice of Allowance, U.S. Appl. No. 16/267,042, dated Feb. 18, 2021, 9 pgs.

* cited by examiner

SECONDARY BATTERY AND ELECTRODE PLATE THEREOF

CROSS-REFERENCE TO RELATED APPLICATIONS

The present application is a continuation of U.S. application Ser. No. 16/267,042, filed on Feb. 4, 2019, which claims priority to Chinese patent application No. 201821651128.4, filed on Oct. 11, 2018, both of which are incorporated herein by reference in their entirety.

FIELD OF THE PRESENT DISCLOSURE

The present disclosure relates to the field of battery, and particularly relates to a secondary battery and an electrode plate thereof.

BACKGROUND OF THE PRESENT DISCLOSURE

An electrode plate of a secondary battery generally comprises a current collector and an active material layer coated on a surface of the current collector. In order to improve safety performance of the secondary battery, some electrode plates 1 choose a current collector 11 in multi-layer structure, referring to FIG. 1 and FIG. 2, the current collector 11 comprises an insulating layer 111 and a conducting layer 112 provided on a surface of the insulating layer 111, and the active material layer 12 is coated on a surface of the conducting layer 112. The conducting layer 112 comprises a main portion 1121 coated with the active material layer 12 and a protruding portion 1122 protruding from the active material layer 12, the protruding portion 1122 is configured to be electrically connected with an electrode terminal of the secondary battery, so the electrode plate 1 can be charged or discharged via the electrode terminal. Referring to FIG. 1, after coating the active material layer 12 on the conducting layer 112, it needs to roll the electrode plate 1 to thin the active material layer 12, thereby improving energy density. However, in the process of rolling, a roller R directly applies a force to the active material layer 12; the protruding portion 1122 of the conducting layer 112 is not coated with the active material layer 12, so the roller R does not apply the force to the protruding portion 1122; referring to FIG. 2, because an elastic modulus of the insulating layer 111 is less than an elastic modulus of the conducting layer 112, when the electrode plate 1 is subjected to the force of the roller R, an amount of deformation of the insulating layer 111 is greater than an amount of deformation of the conducting layer 112, thereby leading to the insulating layer 111 at the boundary between the main portion 1121 and the protruding portion 1122 bulging; when the insulating layer 111 bulges, the protruding portion 1122 will bulge too, at this time, the protruding portion 1122 is prone to bend and generate a crack, thereby reducing the overcurrent capability of the protruding portion 1122.

SUMMARY OF THE PRESENT DISCLOSURE

In view of the problem existing in the background, an object of the present disclosure is to provide a secondary battery and an electrode plate thereof, which can improve safety performance and ensure overcurrent capability of the electrode plate.

In order to achieve the above object, the present disclosure provides a secondary battery and an electrode plate thereof.

The electrode plate comprises a current collector and an active material layer. The current collector a current collector, the current collector including an insulating layer and a first conducting layer disposed on at least one surface of the insulating layer; an active material layer disposed on a main portion of the first conducting layer, wherein the first conducting layer further includes a protruding portion not coated with the active material layer; and a second conducting layer, the second conducting layer including a first portion disposed on a surface of the protruding portion of the first conducting layer opposite to the insulating layer.

In some embodiments, a stiffness of the second conducting layer is less than a stiffness of the first conducting layer. The second conducting layer is made from a non-metallic material, and at least a portion of the non-metallic material is filled into cracks in the first conducting layer.

In some embodiments, the first portion of the second conducting layer is directly connected to the active material layer. In some other embodiments, the first portion of the second conducting layer is connected to the active material layer via a second portion of the second conducting layer located between the first conducting layer and the active material layer.

In some embodiments, the first portion of the second conducting layer extends to two opposite edges of the protruding portion of the first conducting layer; the first portion has a width of 0.1 mm-4 mm; and the second conducting layer has a thickness of 0.1 µm-10 µm.

In some embodiments, the electrode plate further comprises a first protecting layer disposed on a surface of the first portion of the second conducting layer opposite to the protruding portion of the first conducting layer; a hardness of the first protecting layer is greater than a hardness of the first conducting layer and a hardness of the second conducting layer.

In some embodiments, the first protecting layer is directly connected to the active material layer.

The secondary battery comprises an electrode assembly, the electrode assembly comprises the electrode plate.

The present disclosure has the following beneficial effects: when foreign matter pierces the electrode plate, a thickness of the first conducting layer is small, so a burr generated in a part of the first conducting layer pierced by the foreign matter is small, and difficult to pierce the separator, thereby avoiding short circuit, improving safety performance. Even if the protruding portion generates a crack in the process of rolling, the electric current at the crack still can be transmitted to the outside via the second conducting layer, thereby achieving the repair of conductive network, ensuring the whole overcurrent capability of the electrode plate.

Figure 1:
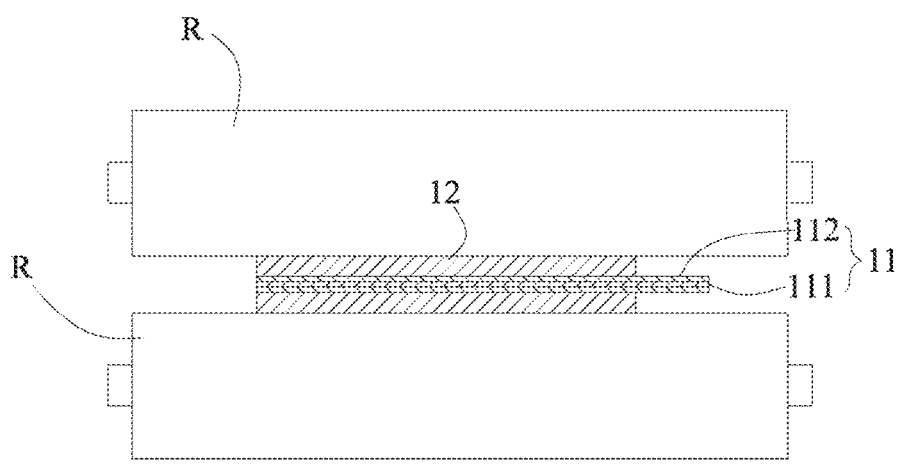
FIG. 1 is a schematic view of an electrode plate of the prior art in the process of rolling.

Reference numerals in figures are represented as follows:
1 electrode plate
  11 current collector
    111 insulating layer
    112 first conducting layer
      1121 main portion
      1122 protruding portion
  12 active material layer
  13 second conducting layer
    131 first portion
    132 second portion
  14 first protecting layer
  15 conductive structure
  16 second protecting layer
1A positive electrode plate
1B negative electrode plate
2 case
3 cap plate
4 electrode terminal
5 separator
6 connecting piece
P electric guiding portion
R roller
W welding region
X width direction
Y thickness direction
Z height direction

DETAILED DESCRIPTION

Hereinafter a secondary battery and an electrode plate thereof according to the present disclosure will be described in detail in combination with the figures.

Figure 4:
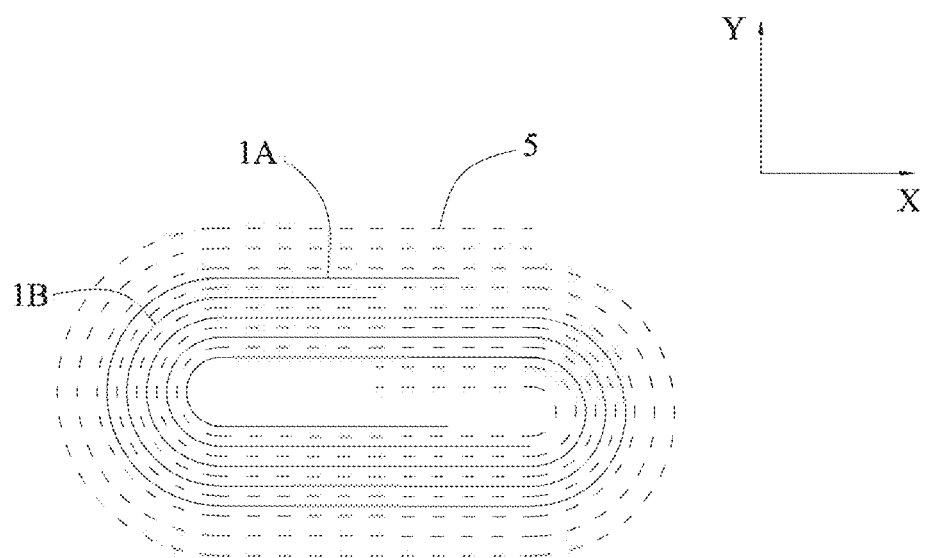
FIG. 4 is a schematic view of an electrode assembly of the secondary battery according to the present disclosure.

Referring to FIG. 4, a secondary battery comprises an electrode assembly, the electrode assembly comprises a positive electrode plate 1A, a negative electrode plate 1B and a separator 5, the separator 5 is provided between the positive electrode plate 1A and the negative electrode plate 1B, the positive electrode plate 1A, the separator 5 and the negative electrode plate 1B are sequentially stacked and wound to be a flat shape.

The secondary battery can be a pouch-type battery, the electrode assembly formed by winding the positive electrode plate 1A, the separator 5 and the negative electrode plate 1B is directly packaged in a pouch, and the pouch can be aluminum plastic film.

Certainly, the secondary battery of the present disclosure also can be a can-type battery. Specifically, referring to FIG. 3, the secondary battery comprises the electrode assembly, a case 2, a cap plate 3, an electrode terminal 4 and a connecting piece 6. The case 2 can have a hexahedron shape or other shape. A receiving cavity is formed inside the case 2 and receives the electrode assembly and an electrolyte. An opening is formed at an end of the case 2, and the electrode assembly can be placed into the receiving cavity of the case 2 via the opening. The case 2 can be made of a conductive metal such as aluminum, aluminum alloy and the like, and also may be made of an insulating material such as plastic.

The cap plate 3 is provided to case 2 and covers the opening of the case 2, thereby sealing the electrode assembly in the case 2. The electrode terminal 4 is provided to the cap plate 3, an upper end of the electrode terminal 4 protrudes above the cap plate 3, and a lower end of the electrode terminal 4 can pass through the cap plate 3 and extend into the case 2. The connecting piece 6 is provided in the case 2 and fixed with the electrode terminal 4. Both of the electrode terminal 4 and the connecting piece 6 each are provided as two in number, the positive electrode plate 1A is electrically connected with one electrode terminal 4 via one connecting piece 6, the negative electrode plate 1B is electrically connected with the other electrode terminal 4 via the other connecting piece 6.

In the secondary battery, at least one of the positive electrode plate 1A and the negative electrode plate 1B employs a later mentioned electrode plate 1.

Figure 5:
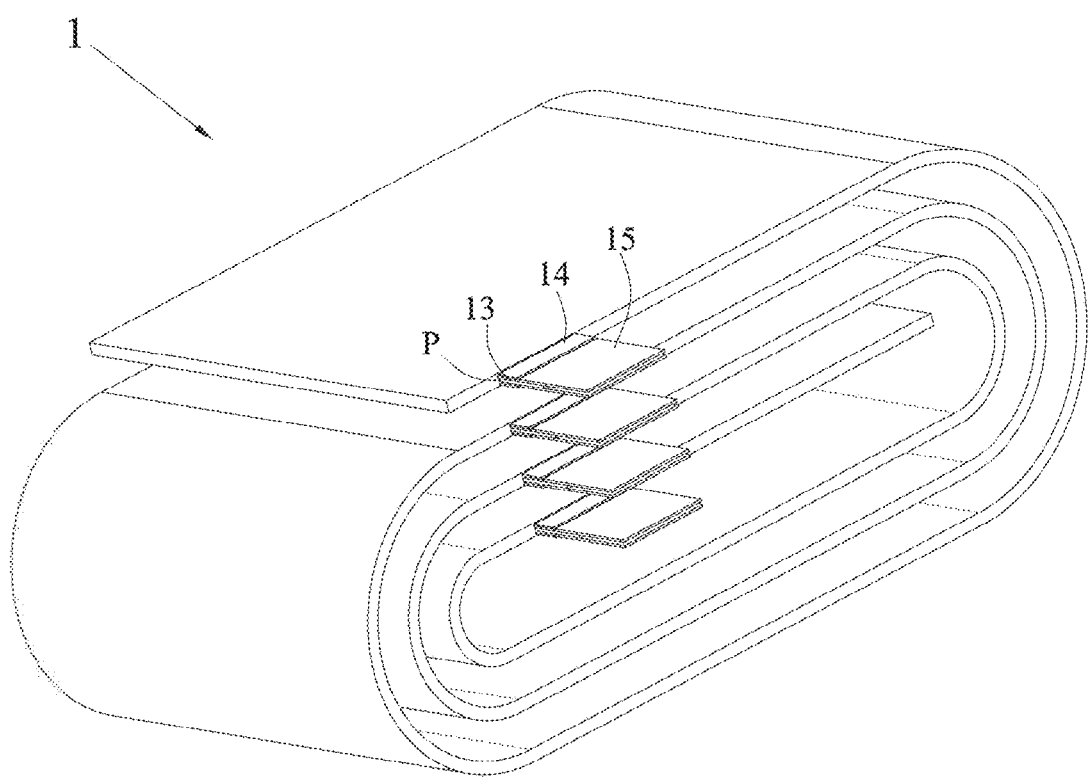
FIG. 5 is a schematic view of an electrode plate according to the present disclosure.
Figure 6:
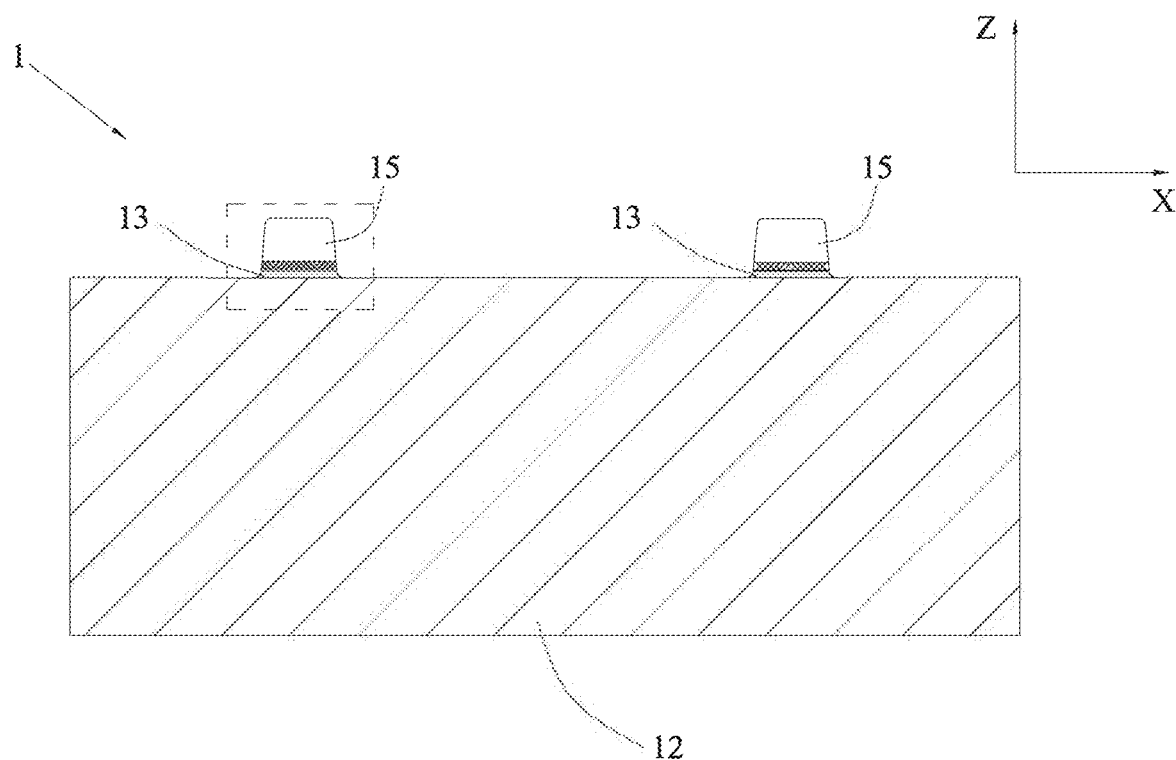
FIG. 6 is another schematic view of the electrode plate according to the present disclosure.
Figure 7:
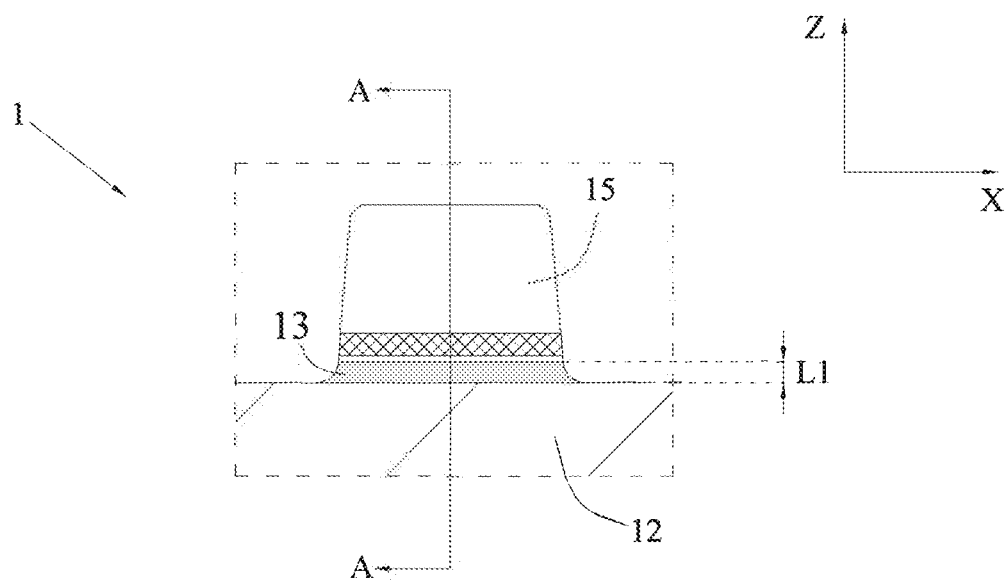
FIG. 7 is an enlarged view of a part of FIG. 6 within a dotted line frame.
Figure 8:
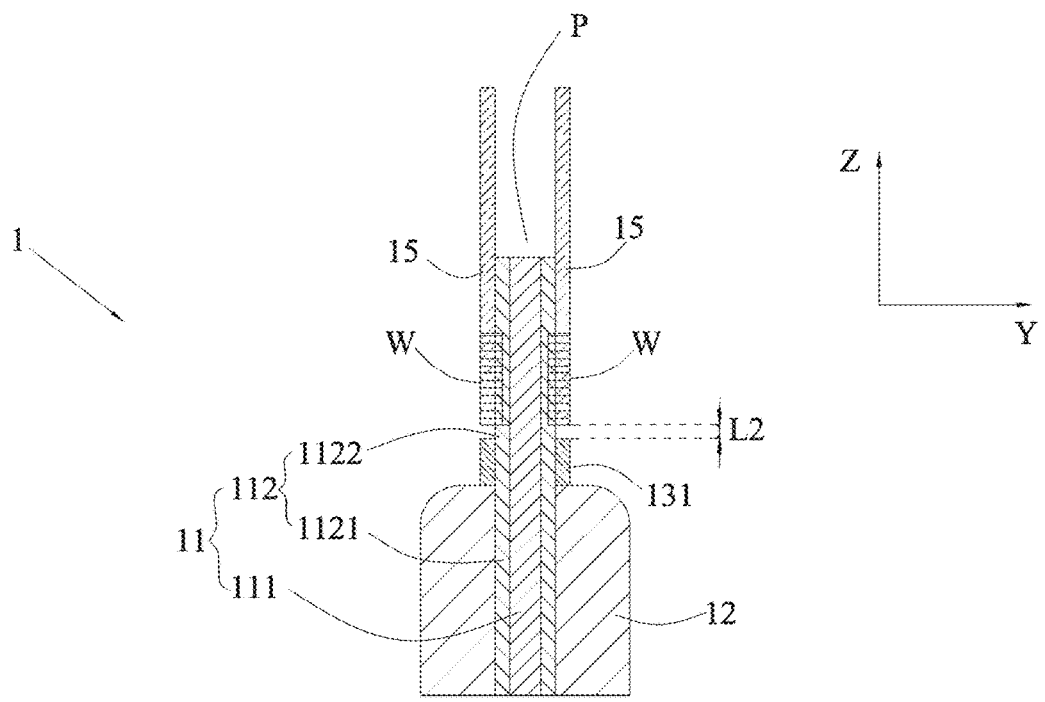
FIG. 8 is a cross sectional view taken along a line A-A of FIG. 7.

FIG. 5 is a schematic view of an electrode plate 1 in a winding state, FIG. 6 is a schematic view of the electrode plate 1 in a spread state, FIG. 7 is an enlarged view of a part of FIG. 6 within a dotted line frame, FIG. 8 is a cross sectional view taken along a line A-A of FIG. 7.

Referring to FIG. 5 to FIG. 8, in an embodiment, the electrode plate 1 comprises a current collector 11 and an active material layer 12. The current collector 11 comprises an insulating layer 111 and a first conducting layer 112 provided on a surface of the insulating layer 111, the first conducting layer 112 has a main portion 1121 and a protruding portion 1122 connected with the main portion 1121, the main portion 1121 is coated with the active material layer 12, the protruding portion 1122 is not coated with the active material layer 12. The active material layer 12 can be directly coated on a surface of the main portion 1121, alternatively, other material also can be provided between the main portion 1121 and the active material layer 12.

The insulating layer 111 can be made of PET (polyethylene terephthalate) film or PP (polypropylene) film, the first conducting layer 112 can be made of a metal, preferably aluminum.

Two surface of the insulating layer 111 are completely coated with the first conducting layer 112. A thickness of the insulating layer 111 can be 1 μm-20 μm; a thickness of the first conducting layer 112 can be 0.1 μm~10 μm. Because the first conducting layer 112 is thin, in the process of cutting, a burr generated in the first conducting layer 112 is small, and difficult to pierce the separator 5 more than ten micrometers, thereby avoiding short circuit and improving safety performance.

A part of the insulating layer 111 corresponding to the protruding portion 1122 and the protruding portion 1122 together form an electric guiding portion P, the electrode plate 1 has a plurality of electric guiding portions P; referring to FIG. 5, after winding, the plurality of electric guiding portions P of the electrode plate 1 stack.

When foreign matter pierces the electrode plate 1, the thickness of the first conducting layer 112 is small, so a burr generated in a part of the first conducting layer 112 pierced by the foreign matter is small, and difficult to pierce the separator 5, thereby avoiding short circuit, improving safety performance.

Referring to FIG. 7 and FIG. 8, the electrode plate 1 further comprises a second conducting layer 13, the second conducting layer 13 comprises a first portion 131, the first portion 131 is provided on a surface of the protruding portion 1122 away from the insulating layer 111.

Figure 2:
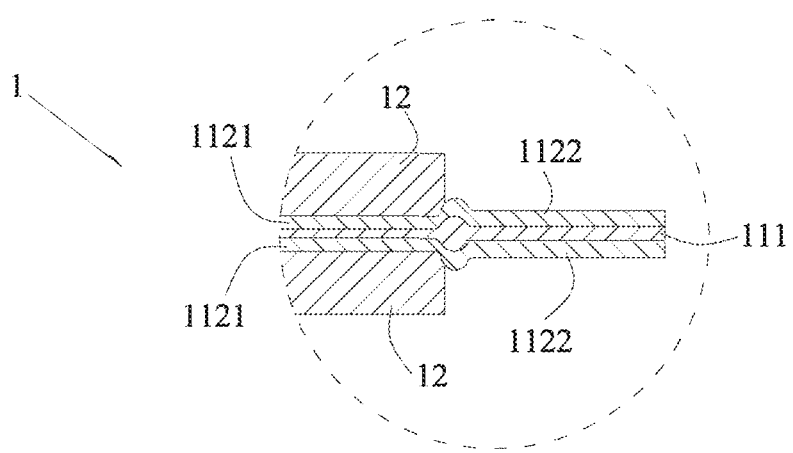
FIG. 2 is a schematic view of the electrode plate of FIG. 1 after rolling.

After coating the active material layer 12 on the first conducting layer 112, it needs to roll the electrode plate 1 to thin the active material layer 12, thereby improving energy density. However, in the process of rolling, a roller R directly applies a force to the active material layer 12; the protruding portion 1122 of the first conducting layer 112 is not coated with the active material layer 12, so the roller R does not apply the force to protruding portion 1122. Referring to FIG. 1 and FIG. 2, in the prior art, an elastic modulus of the insulating layer 111 is less than an elastic modulus of the first conducting layer 112, therefore, when the electrode plate 1 is subjected to the force of the roller R, the amount of deformation of the insulating layer 111 is greater than the amount of deformation of the first conducting layer 112, thereby leading to the insulating layer 111 at the boundary between the main portion 1121 and the protruding portion 1122 bulging; when the insulating layer 111 bulges, the protruding portion 1122 will bulge too, at this time, the protruding portion 1122 is prone to bend and generate a crack, thereby reducing the overcurrent capability of the protruding portion 1122. In the electrode plate 1 of the present disclosure, even if the protruding portion 1122 generates a crack in the process of rolling, the electric current at the crack still can be transmitted to the outside via the second conducting layer 13, thereby achieving the repair of conductive network, ensuring the whole overcurrent capability of the electrode plate 1.

A stiffness of the second conducting layer 13 is less than a stiffness of the first conducting layer 112, in other words, when the second conducting layer 13 is subjected to a force, the second conducting layer 13 deforms more easily; therefore, when the first conducting layer 112 deforms, the second conducting layer 13 will deform with the first conducting layer 112; even if the first conducting layer 112 fractures due to an excessive deformation, the second conducting layer 13 will be difficult to be fractured, thereby ensuring transmission of the electric current.

The second conducting layer 13 can be made of a metallic material or a non-metallic material. In order to decrease the burr generated when foreign matter pierces the electrode plate 1, the second conducting layer 13 is preferably made from the non-metallic material which is not prone to generate the burr. For example, in the process of producing the electrode plate 1, a conductive carbon, a binder and a solvent are prepared into a slurry, then the slurry is coated on the surface of the first conducting layer 112, the second conducting layer 13 is formed after drying the slurry.

When a crack is generated in the protruding portion 1122, the second conducting layer 13 can be filled in the crack of the protruding portion 1112. The conductive carbon of the second conducting layer 13 can repair the crack of the protruding portion 1122, thereby improving the overcurrent capability. In addition, after filling the second conducting layer 13 in the protruding portion 1122, a connecting area between the first conducting layer 112 and the second conducting layer 13 can be increased and the connecting strength can be improved. Moreover, the second conducting layer 13 is filled in the crack of the protruding portion 1122, so the second conducting layer 13 can avoid the electrolyte entering into between the first conducting layer 112 and the insulating layer 111 via the crack, prevent the first conducting layer 112 and the insulating layer 111 separating from each other.

Referring to FIG. 8, the first portion 131 is preferably connected with the active material layer 12; in other words, the first portion 131 preferably contacts the active material layer 12, thereby improving connecting force of the first portion 131 in the electrode plate 1 and avoiding the first portion 131 and the protruding portion 1122 falling off together. In addition, when the roller R applies a force to the active material layer 12, the stress concentration at a root portion of the protruding portion 1122 (that is, a boundary between the protruding portion 1122 and the main portion 1121) is most serious, and a crack is the most prone to be generated at the root portion of the protruding portion 1122, so when the first portion 131 is connected with the active material layer 12, the first portion 131 can cover the crack, thereby improving the overcurrent capability of the electrode plate 1.

When the generated crack extends in the width direction X, it will seriously affect the overcurrent capability of the protruding portion 1122. Referring to FIG. 7, in the width direction X, the first portion 131 extends to two side edges of the protruding portion 1122, which can maximize the covering scope of the first portion 131; even if the generated crack extends in the width direction X, the first portion 131 still can cover the crack of the protruding portion 1122, thereby decreasing damage of the crack to the maximum extent, improving overcurrent capability of the electrode plate 1.

In the height direction Z, a dimension L1 of the first portion 131 is 0.1 mm~4 mm. If the dimension L1 of the first portion 131 is less than 0.1 mm, the connecting force between the first portion 131 and the protruding portion 1122 is small, the first portion 131 is prone to fall off; at the same time, the first portion 131 cannot completely cover the crack of the protruding portion 1122, which will affect the overcurrent capability of the electrode plate 1. If the dimension L1 of the first portion 131 is greater than 4 mm, the first portion 131 will excessively occupy space. In the thickness direction Y, a dimension of the second conducting layer 13 is 0.1 μm~10 μm.

Figure 3:
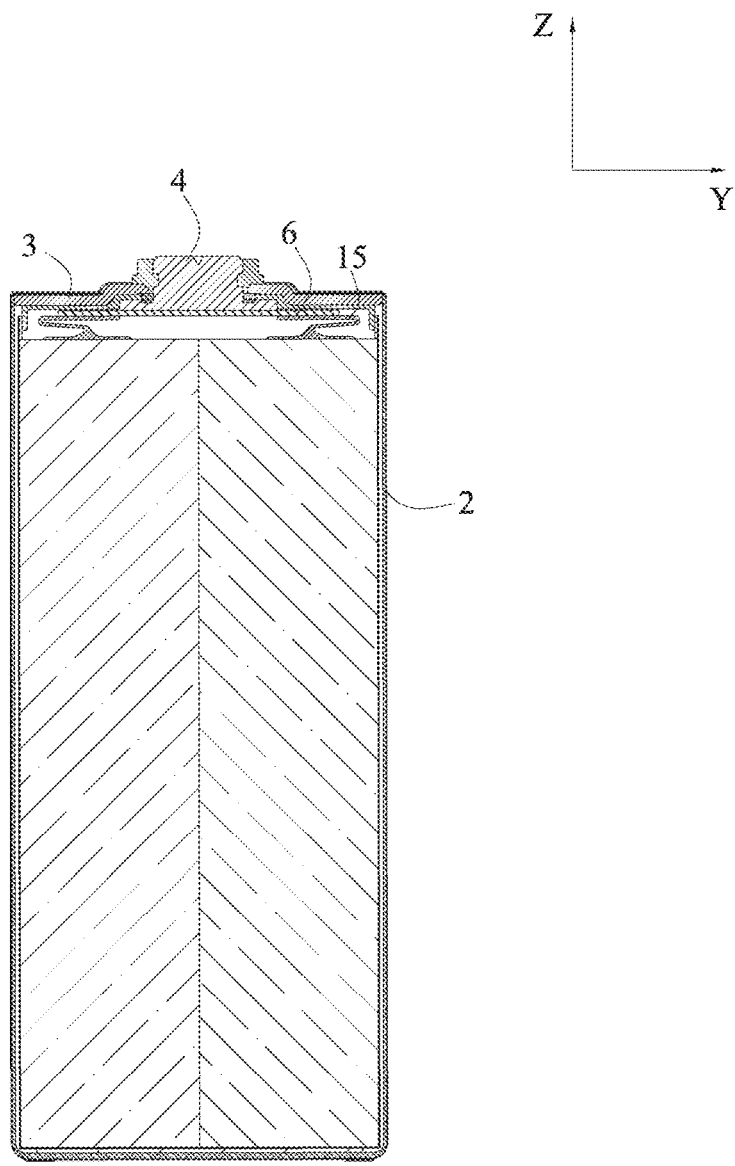
FIG. 3 is a schematic view of a secondary battery according to the present disclosure.

The electrode plate 1 further comprises a conductive structure 15, the conductive structure 15 is welded with a region of the protruding portion 1122 to form a welding region W, the region is not covered by the first portion 131; a gap is provided between the welding region W and the first portion 131. Referring to FIG. 5, the electrode plate 1 can comprises a plurality of conductive structures 15, after winding, positions of the plurality of conductive structures 15 of the electrode plate 1 correspond to each other, and the conductive structure 15 is provided between every two adjacent electric guiding portions P, the plurality of conductive structures 15 are welded together to collect the electric current in the first conducting layers 112 on two sides of the insulating layer 111. Referring to FIG. 3, the conductive structure 15 is fixed with the connecting piece 6; the electric current in the electrode plate 1 can be transmitted to the outside via the connecting piece 6 and the electrode terminal 4.

Referring to FIG. 8, a dimension L2 of the gap between the welding region W and the first portion 131 in the height direction Z is 0.05 mm~1.5 mm. The dimension tolerance existing in the coating process of the first portion 131 and the welding process of the conductive structure 15 cannot be avoided, if there is no gap between the welding region W and the first portion 131, the welding region W may be formed to the first portion 131 in the process of welding. The first portion 131 is made from a non-metallic material, if the welding region W is formed to the first portion 131, it will lead to poor welding, reduce the connecting strength between the protruding portion 1122 and the conductive structure 15. In addition, the first portion 131 also may damage the welding apparatus.

Figure 9:
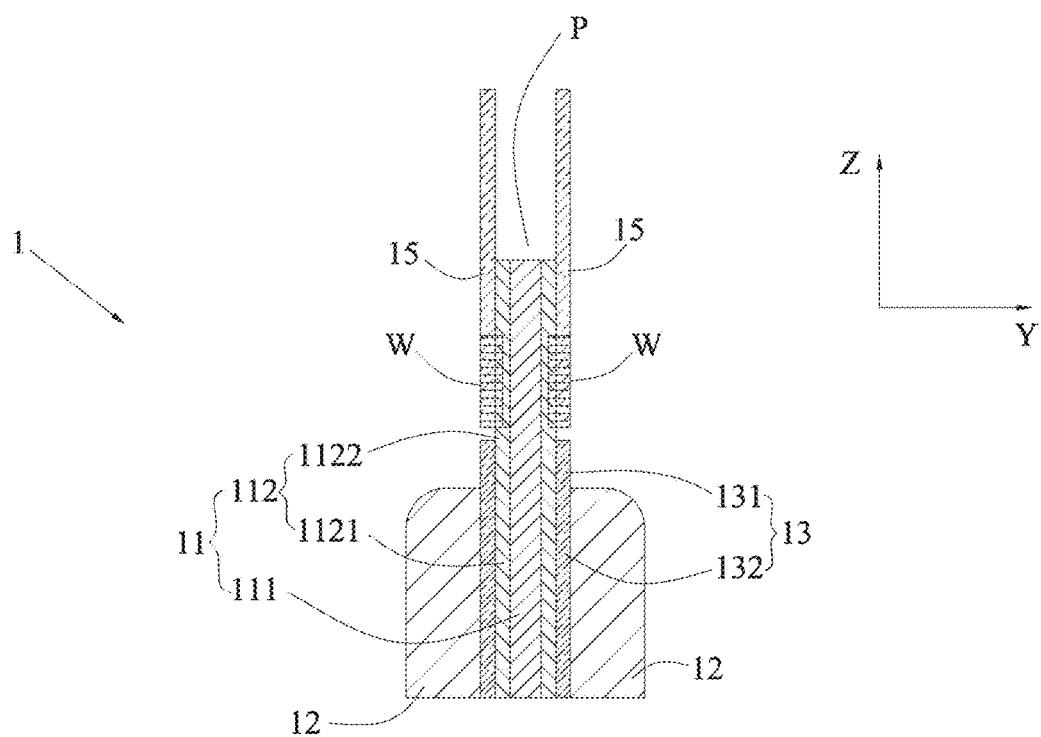
FIG. 9 is a schematic view of another embodiment of the electrode plate according to the present disclosure.

In another embodiment, referring to FIG. 9, the second conducting layer 13 comprises a second portion 132, the second portion 132 is connected with the first portion 131 and provided between the main portion 1121 and the active material layer 12. The electric current generated in the active material layer 12 can be transmitted to the outside via the second portion 132, so the second conducting layer 13 can further improve the capability of the electrode plate 1 in collecting the electric current. When the main portion 1121 generates a crack in the process of rolling, the second portion 132 also can be filled in the crack of the main portion 1121. The conductive carbon in the second portion 132 can repair the crack in the main portion 1121, thereby improving overcurrent capability.

In addition, the second conducting layer 13 is formed by drying the slurry, when foreign matter pierces the second portion 132, the second conducting layer 13 is difficult to generate a burr; in addition, the thickness of the second conducting layer 13 is small (0.1 μm~10 μm), so even if a burr is generated, the burr still cannot pass through the first conducting layer 112 and the separator 5, thereby avoiding short circuit and improving safety performance.

Figure 10:
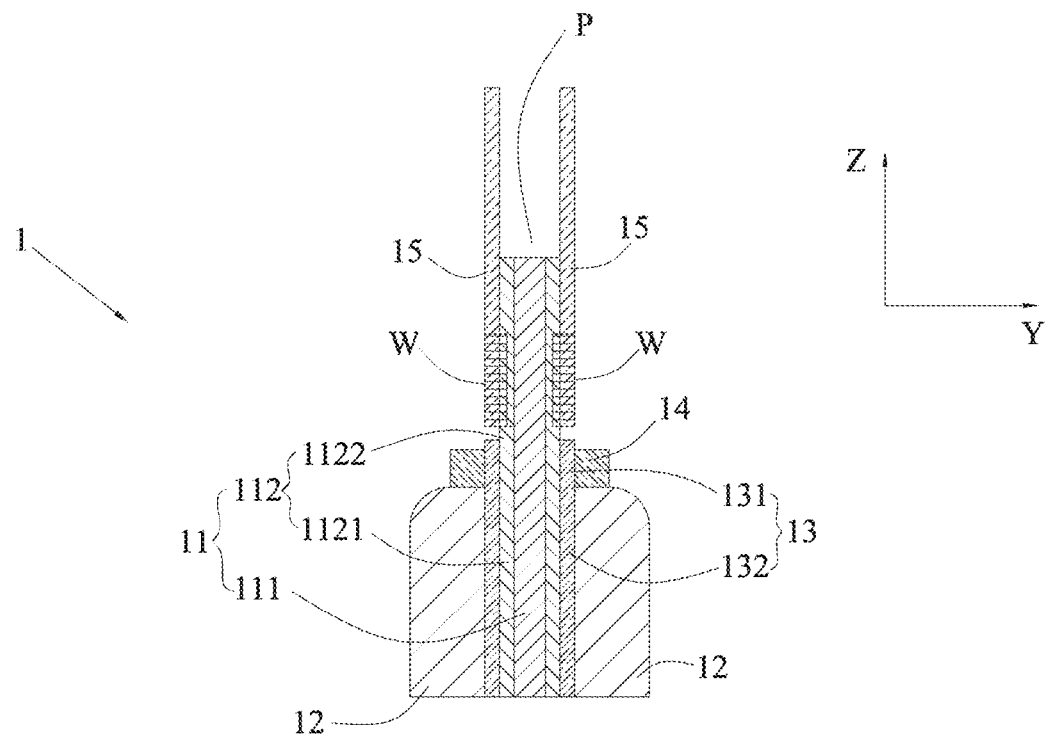
FIG. 10 is a schematic view of still another embodiment of the electrode plate according to the present disclosure.

In another embodiment, referring to FIG. 10, the electrode plate 1 further comprises a first protecting layer 14, the first protecting layer 14 is provided at a side of the first portion 131 away from the protruding portion 1122; in other words, at least a part of the first portion 131 is coated with the first protecting layer 14. The first protecting layer 14 comprises a binder and an insulating material. The insulating material comprises at least one of aluminum oxide and aluminum oxyhydroxide. The binder and the insulating material are mixed to produce a slurry, the slurry is coated on a surface of the protruding portion 1122, and the first protecting layer 14 is formed after drying the slurry.

A hardness of the first protecting layer 14 is greater than a hardness of the second conducting layer 13. The first protecting layer 14 has a greater strength, so the first protecting layer 14 can provide a supporting force for the protruding portion 1122 and the first portion 131 in the process of rolling the electrode plate 1, thereby limiting the deformation of the protruding portion 1122 and the first portion 131, decreasing the probability of generating the crack in the protruding portion 1122, improving overcurrent capability of the electrode plate 1.

In the working process of the secondary battery, vibration and other factors may lead to the first portion 131 falling off; preferably, the first protecting layer 14 is connected with the active material layer 12, thereby increasing the connecting force of the first protecting layer 14 in the electrode plate 1, improving anti-vibration capability, and avoiding the first protecting layer 14 and the first portion 131 falling off together. At the same time, the crack is most prone to be generated at a root portion (that is, the boundary between the protruding portion 1122 and the main portion 112) of the protruding portion 1122 close to the active material layer 12, therefore, when the first protecting layer 14 is connected with the active material layer 12, it can avoid the protruding portion 1122 cracking, thereby improving the overcurrent capability of the electrode plate 1.

In order to decrease a space occupied by the electrode plate 1 in the height direction Z, the electric guiding portion P and the conductive structure 15 generally needs to be bent. Because the first protecting layer 14 has a greater hardness, if the first protecting layer 14 is further coated in the gap between the welding region W and the first portion 131, it will lead to the electric guiding portion P being difficult to bend. Therefore, in order to avoid the first protecting layer 14 being coated in the gap, preferably, in a direction away from the active material layer 12, the first portion 131 is beyond the first protecting layer 14, which can avoid the first protecting layer 14 being coated in the gap due to process error. Certainly, if it can ensure process accuracy, referring to FIG. 11, the first portion 131 also can be flush with the first protecting layer 14.

In the thickness direction Y, a surface of the first protecting layer 14 away from the protruding portion 1122 is lower than a surface of the active material layer 12 away from the main portion 1121, so it can avoid the first protecting layer 14 increasing overall thickness of the electrode plate 1, ensure the energy density of the secondary battery. At the same time, when rolling the active material layer 12, it can prevent the roller R applying the force to the first protecting layer 14, avoid the roller R damaging the first protecting layer 14.

Figure 11:
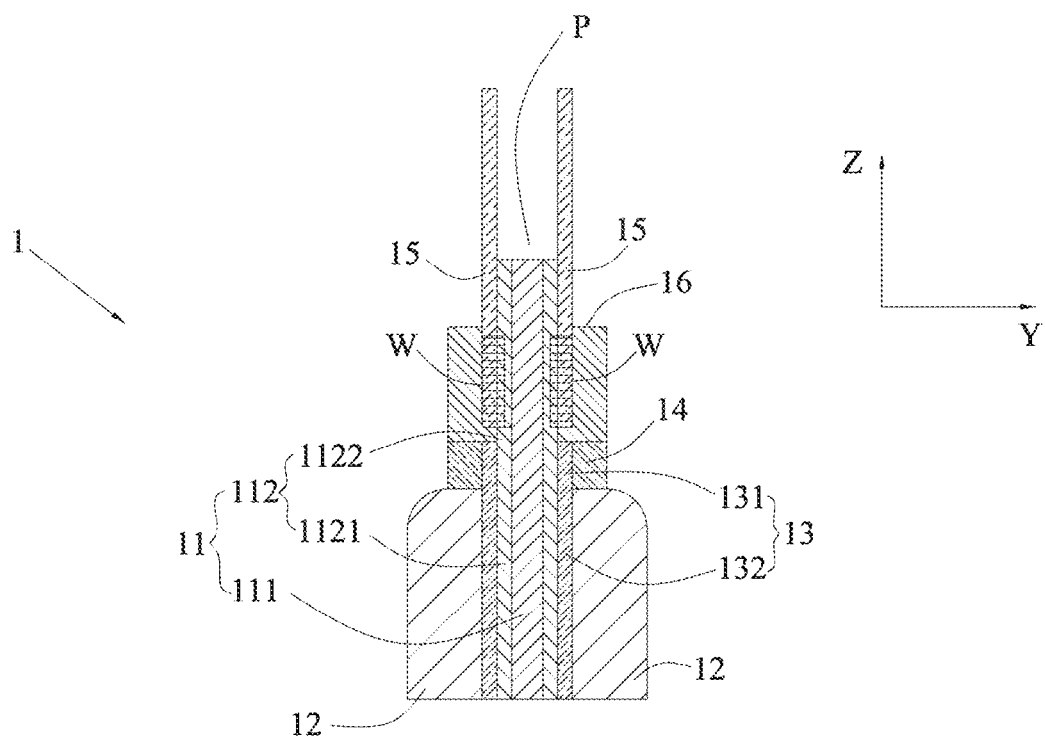
FIG. 11 is a schematic view of further another embodiment of the electrode plate according to the present disclosure.

Referring to FIG. 11, the electrode plate 1 further comprises a second protecting layer 16 provided on a surface of the welding region W away from protruding portion 1122. The surface of the welding region W away from the protruding portion 1122 is uneven, which may pierce the separator 5 and cause the risk of short circuit. By providing the second protecting layer 16, it can separate the surface of the welding region W and the separator 5, avoid the separator 5 being pierced, and improve safety performance. The second protecting layer 16 can be formed by curing an insulating adhesive. The second protecting layer 16 is flexible, so even if the second protecting layer 16 is coated in the gap between the welding region W and the first portion 131, the second protecting layer 16 will not affect bend of the electric guiding portion P.

What is claimed is:

1. An electrode plate of a secondary battery, comprising:
   a current collector, the current collector including an insulating layer and a first conducting layer disposed on at least one surface of the insulating layer;
   an active material layer disposed on a main portion of the first conducting layer, wherein the first conducting layer further includes a protruding portion not coated with the active material layer; and
   a second conducting layer, the second conducting layer including a first portion disposed on a surface of the protruding portion of the first conducting layer opposite to the insulating layer;
   wherein the second conducting layer is made from a non-metallic material, and at least a portion of the non-metallic material is filled into cracks in the first conducting layer.

2. The electrode plate according to claim 1, wherein a stiffness of the second conducting layer is less than a stiffness of the first conducting layer.

3. The electrode plate according to claim 1, wherein the first portion of the second conducting layer is directly connected to the active material layer.

4. The electrode plate according to claim 1, wherein the first portion of the second conducting layer is connected to the active material layer via a second portion of the second conducting layer located between the first conducting layer and the active material layer.

5. The electrode plate according to claim 1, wherein the first portion of the second conducting layer extends to two opposite edges of the protruding portion of the first conducting layer;
   the first portion has a width of 0.1 mm-4 mm; and the second conducting layer has a thickness of 0.1 μm-10 μm.

6. The electrode plate according to claim 1, further comprising:
a first protecting layer disposed on a surface of the first portion of the second conducting layer opposite to the protruding portion of the first conducting layer,
wherein a hardness of the first protecting layer is greater than a hardness of the first conducting layer and a hardness of the second conducting layer.

7. The electrode plate according to claim 6, wherein the first protecting layer is directly connected to the active material layer.

8. A secondary battery, comprising an electrode assembly;
the electrode assembly comprising an electrode plate, the electrode plate comprising:
a current collector, the current collector including an insulating layer and a first conducting layer disposed on at least one surface of the insulating layer;
an active material layer disposed on a main portion of the first conducting layer, wherein the first conducting layer further includes a protruding portion not coated with the active material layer; and
a second conducting layer, the second conducting layer including a first portion disposed on a surface of the protruding portion of the first conducting layer opposite to the insulating layer;
wherein the second conducting layer is made from a non-metallic material, and at least a portion of the non-metallic material is filled into cracks in the first conducting layer.

9. The secondary battery according to claim 8, wherein a stiffness of the second conducting layer is less than a stiffness of the first conducting layer.

10. The secondary battery according to claim 8, wherein the first portion of the second conducting layer is directly connected to the active material layer.

11. The secondary battery according to claim 8, wherein the first portion of the second conducting layer is connected to the active material layer via a second portion of the second conducting layer located between the first conducting layer and the active material layer.

12. The secondary battery according to claim 8, wherein the first portion of the second conducting layer extends to two opposite edges of the protruding portion of the first conducting layer;
the first portion has a width of 0.1 mm-4 mm; and
the second conducting layer has a thickness of 0.1 μm-10 μm.

13. The secondary battery according to claim 8, wherein the electrode plate further comprises a first protecting layer disposed on a surface of the first portion of the second conducting layer opposite to the protruding portion of the first conducting layer,
wherein a hardness of the first protecting layer is greater than a hardness of the first conducting layer and a hardness of the second conducting layer.

14. The secondary battery according to claim 13, wherein the first protecting layer is directly connected to the active material layer.

\* \* \* \* \*